S. E. HORNER.
SINK STRAINER STOPPER.
APPLICATION FILED FEB. 13, 1909.

927,047.

Patented July 6, 1909.

Witnesses
L. Douville
O. F. Nagle

Inventor
Samuel E. Horner
By
Wederheim & Fairbanks,
Attorneys

UNITED STATES PATENT OFFICE.

SAMUEL E. HORNER, OF BRIDGETON, NEW JERSEY.

SINK-STRAINER STOPPER.

No. 927,047. Specification of Letters Patent. Patented July 6, 1909.

Application filed February 13, 1909. Serial No. 477,569.

*To all whom it may concern:*

Be it known that I, SAMUEL E. HORNER, a citizen of the United States, residing at Bridgeton, county of Cumberland, State of New Jersey, have invented a new and useful Sink-Strainer Stopper, of which the following is a specification.

My invention relates to a stopper for a strainer of a sink or other device and consists of a disk or plate of pliable material such as soft rubber, a handle for locating and removing the device, means for connecting said handle with said disk in a firm and tightly-closed manner, while permitting the stopper to lie flat on a strainer, and means for strengthening the disk at the place of connection of the handle with the latter, as will be hereinafter described, the novel features being set forth in the claims.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1:
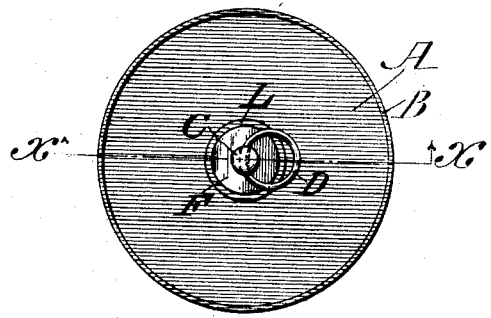
Figure 2:
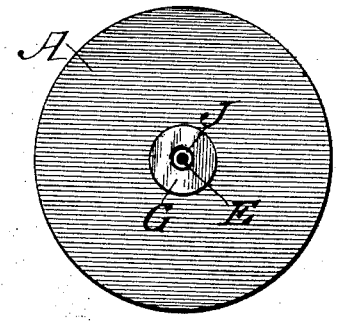
Figure 3:
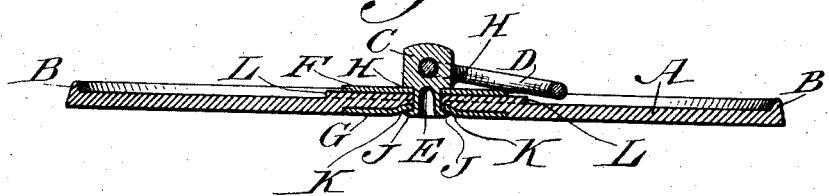

Figures 1 and 2 represent plan views of opposite sides of a stopper embodying my invention. Fig. 3 represents a diametrical section thereof, on line *x—x*, Fig. 1, on an enlarged scale.

Similar letters of reference indicate corresponding parts in the figures.

Referring to the drawings:—A designates a disk of pliable material, preferably soft rubber, the same having a raised rib B circumferentially thereon, whereby the circumference of the disk is vastly strengthened and well-enabled to endure the blows to which it will be subjected, especially in dropping it on the sink or strainer.

C designates an ear, to which the handle-ring D is attached, said ear having depending from it the tubular or partly tubular shank E, which passes centrally through the washer F, the disk A, and the washer G, said washers F and G being on opposite sides of the disk, the shank being of less diameter than the underside of the ear C, thus forming the shoulder H, which bears upon and rests against the washer F. The lower end of the shank is swaged outwardly forming the hollow flange J, which is easily, but tightly, clenched on the wall of the opening in the washer G, said wall being countersunk as at K, whereby the outer face of the flange J is flush or comparatively flush, or in the same plane, with that of the washer K, and consequently that of the disk A, while the disk is firmly connected with the ear, through the medium of the shoulder H, the clenched-shank E, and the washers F, G, whereby also water cannot pass through the device from above under the shoulder H and the openings in the disk and washers. Furthermore, the device will rest flat on the strainer without humping, and retain its position by suction, closing the strainer without liability to rise therefrom until properly removed.

The countersink of the flange J enters the contiguous portion of the disk and so compresses and thins the same, to compensate for which the relative portion of the disk has an elevation L, which increases the thickness of, and consequently reinforces the disk at said portion adding strength thereto, a feature of importance, especially as said portion is compressed and contracted by the upper and lower flanges F, G, due to the tightening action of the shoulder H on one flange and the clenching flange J on the other flange, and the pressure of said members on the contiguous portions of the washers and the portion of the disk intermediate of the latter.

The rib B, while strengthening the periphery of the disk as has been stated, may also form a close-joint with the vertical side wall of the strainer where existing, so as to prevent leaking of water thereat.

Having thus described my invention, what I claim as new and desire to secure by Letters Patent, is:—

1. In a stopper of the character stated, a substantially flat disk of pliable material having the raised rib disposed circumferentially thereon at its extreme outer edge, a handle-ear on the upper side thereof, washers on opposite sides thereof, a shank continuous of said ear and passing through said disk and washers, said shank being tubular and having on its lower end a hollow flange which is clenched on the adjacent washer.

2. In a stopper of the character stated, a substantially flat disk of pliable material, a handle-ear on the upper side thereof, washers on opposite sides thereof, a shank continuous of said ear and passing through said disk and washers, said shank being tubular at that portion passed through the disk and having on its lower end a hollow flange which is clenched on the adjacent washer, the latter having a countersink centrally thereon and said flange being seated thereon with the outer face of the flange comparatively flush with the under face of the disk.

3. In a stopper of the character stated, a substantially flat disk of pliable material, a handle-ear on the upper side thereof, washers on opposite sides of said disk, a shoulder on the under side of said ear, the same engaging the adjacent washer, a shank continuous of said ear adapted to pass through said disk and washers, said shank being tubular at that portion passed through the disk, and having on its lower end a hollow flange which is clenched on the adjacent washer, the latter being countersunk centrally whereon said flange is seated with the outer face of the flange comparatively flush with the under face of the disk.

4. In a stopper of the character stated, a substantially flat disk of pliable material having a circumferential rib at the outer periphery thereof, washers on opposite sides of said disk, a handle-ear on the upper washer and having on its under side a shoulder which engages said washer, and a shank on said ear, the same passing through said disk and washers and having its lower end clenched on the lower washer, said disk having between the same and the upper washer an upward-extension of its material forming a reinforce, the lower washer and the clenching end of said shank being comparatively in the same plane as the underside of the disk.

SAMUEL E. HORNER.

Witnesses:
MARTHA T. COLLINS,
DAVID M. BOWEN.